US011534955B2

(12) United States Patent
Blochmann et al.

(10) Patent No.: US 11,534,955 B2
(45) Date of Patent: Dec. 27, 2022

(54) METHOD AND APPARATUS FOR PROCESSING PLASTIC CONTAINERS WITH SPEED-CONTROLLABLE BLOW MOULDING MACHINE

(71) Applicant: KRONES AG, Neutraubling (DE)

(72) Inventors: Erik Blochmann, Neutraubling (DE); Jochen Forsthoevel, Regensburg (DE)

(73) Assignee: KRONES AG, Neutraubling (DE)

( * ) Notice: Subject to any disclaimer, the term of this patent is extended or adjusted under 35 U.S.C. 154(b) by 117 days.

(21) Appl. No.: 16/761,560

(22) PCT Filed: Nov. 8, 2018

(86) PCT No.: PCT/EP2018/080565
§ 371 (c)(1),
(2) Date: May 5, 2020

(87) PCT Pub. No.: WO2019/092078
PCT Pub. Date: May 16, 2019

(65) Prior Publication Data
US 2021/0170665 A1 Jun. 10, 2021

(30) Foreign Application Priority Data
Nov. 9, 2017 (DE) .................... 10 2017 126 240.7

(51) Int. Cl.
B29C 49/78 (2006.01)
B67C 3/22 (2006.01)
(Continued)

(52) U.S. Cl.
CPC .............. B29C 49/78 (2013.01); B29C 49/06 (2013.01); B29C 49/4273 (2013.01);
(Continued)

(58) Field of Classification Search
CPC .......... B06B 1/166; B29C 2949/78571; B29C 49/06; B29C 49/4273; B29C 49/64;
(Continued)

(56) References Cited

U.S. PATENT DOCUMENTS 5,718,852 A * 2/1998 Campbell ............... B29C 49/42
264/40.1
7,900,422 B2 * 3/2011 Fischer ................. B67C 7/0073
53/426

(Continued)

FOREIGN PATENT DOCUMENTS

DE 102011017448 10/2012
DE 102015114947 3/2017
(Continued)

OTHER PUBLICATIONS

Excerpt from "Blowing Machine Operation Manual", Sep. 15, 2012. Accessed on the internet: https://www.doc88.com/p-972466562274.html?r=1.
(Continued)

Primary Examiner — Andrew M Tecco
Assistant Examiner — Nicholas E Igbokwe
(74) Attorney, Agent, or Firm — Onello & Mello, LLP

(57) ABSTRACT

The invention relates to a method for processing plastic preforms (10) and/or plastic containers (20) by means of at least one first processing apparatus (2), which processes the plastic containers (10, 20) in a first specified manner, and by means of at least one second processing apparatus (4), which processes the plastic containers (10, 20) in a second specified manner and which is arranged before or after the first processing apparatus (2), wherein the plastic containers (10, 20) are transported from one processing apparatus (2, 4) to the other processing apparatus (2, 4) by means of a transport apparatus (5) and the at least first processing apparatus (2)
(Continued)

Figure 1:
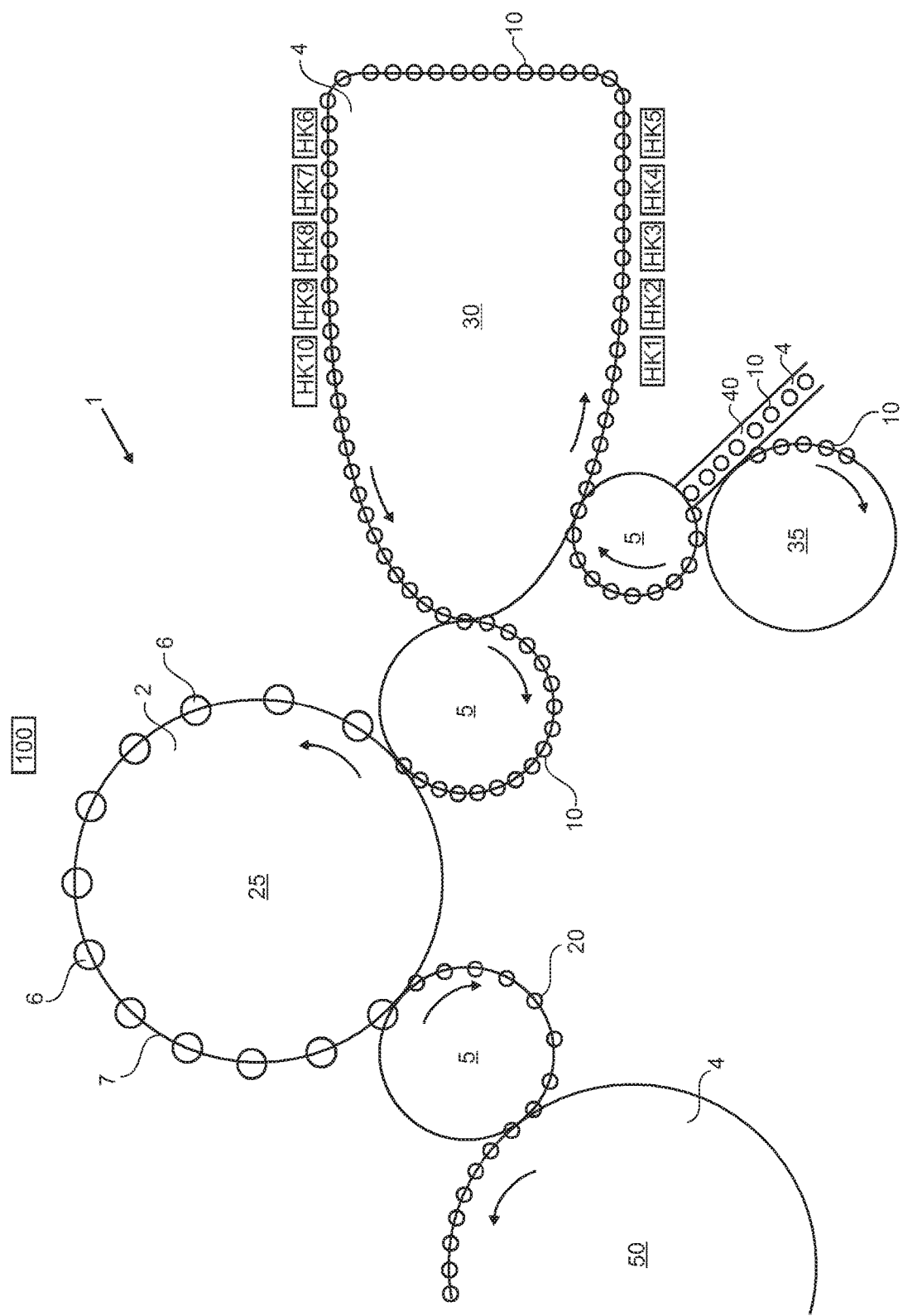

and the at least second processing apparatus (4) are coupled to each other, the first treatment apparatus (2) is a blow-molding machine (25) for shaping plastic preforms (10) to form plastic containers (20), and the process speed of the blow-molding machine (25) is defined by means of a specification, which contains a plurality of process parameters that are characteristic of the shaping process. According to the invention, the process parameters associated with at least one further process speed are at least partially determined on the basis of at least two key specifications, such that the adaptation of the process speed of the blow-molding machine (25) to a speed of at least one further processing apparatus (2, 4) is enabled and/or adjustment of the speed is possible.

13 Claims, 2 Drawing Sheets

(51) Int. Cl.
*B67C 7/00* (2006.01)
*B29C 49/06* (2006.01)
*B29C 49/42* (2006.01)
*B29C 49/64* (2006.01)
*B29L 31/00* (2006.01)

(52) U.S. Cl.
CPC .......... *B29C 49/6409* (2013.01); *B67C 3/22* (2013.01); *B67C 7/004* (2013.01); *B29L 2031/7158* (2013.01); *B67C 2003/227* (2013.01); *B67C 2007/006* (2013.01); *B67C 2007/0066* (2013.01)

(58) Field of Classification Search
CPC .............. B29C 49/6409; B29C 49/78; B67C 2007/006; B67C 2007/0066; B67C 7/004; B67C 2003/227; B67C 3/22; B29L 2031/7158
See application file for complete search history.

(56) References Cited

U.S. PATENT DOCUMENTS

| | | | |
|---|---|---|---|
| 9,375,878 | B2 | 6/2016 | Hahn et al. |
| 10,131,083 | B2 | 11/2018 | Herold |
| 10,406,741 | B2 | 9/2019 | Gendre et al. |
| 10,489,263 | B2 | 11/2019 | Grimm |
| 2007/0235906 | A1* | 10/2007 | Trouillet ................. B29C 49/64 264/528 |
| 2011/0061343 | A1* | 3/2011 | Roithmeier ............. B29C 49/42 53/452 |
| 2013/0231772 | A1 | 9/2013 | Hahn et al. |
| 2014/0298100 | A1* | 10/2014 | Grimm ..................... B67B 3/26 714/37 |
| 2015/0079220 | A1* | 3/2015 | Lindner .............. B29C 49/6409 425/526 |
| 2016/0257057 | A1* | 9/2016 | Herold .................... B29C 49/58 |
| 2016/0325485 | A1* | 11/2016 | Gendre ................ B29C 49/786 |
| 2019/0022915 | A1 | 1/2019 | Zoelfl et al. |
| 2019/0025796 | A1 | 1/2019 | Gschrey et al. |

FOREIGN PATENT DOCUMENTS

| | | |
|---|---|---|
| WO | 2016012704 | 1/2016 |
| WO | 2017144145 | 8/2017 |

OTHER PUBLICATIONS

Chinese Office Action dated Jul. 15, 2021 issued in corresponding Chinese Application No. 201880072768.6, with machine translation to English.
International Search Report and Written Opinion dated Feb. 27, 2019 issued in corresponding International Application No. PCT/EP2018/080565.
German Search Report dated Aug. 23, 2018 issued in corresponding German Application No. 102017126240.7.

* cited by examiner

METHOD AND APPARATUS FOR PROCESSING PLASTIC CONTAINERS WITH SPEED-CONTROLLABLE BLOW MOULDING MACHINE

The present invention relates to a method and an apparatus for processing plastic preforms and/or plastic containers. Processing devices for plastic preforms and plastic containers have been known for a long time from the prior art. During production, the plastic preforms and plastic containers usually run through a series of the very different and very varied processing operations. These include for example production of the preforms, heating of the preforms, transforming of the preforms into containers, sterilisation of the preforms and/or containers, filling and closing of the containers or also packaging of the filled and closed containers. In order to co-ordinate these successively running processing steps with one another, the individual processing devices in the prior art are synchronised with one another or are combined in a block or coupled to one another. In this case, in particular, the speeds of the individual processing devices must coordinated with one another in order to prevent individual processing devices in the meantime from intermittently coming to a standstill or to prevent the containers from being processed for too long or too short a time, since the transfer to the following processing device is not yet possible. For this purpose, before operation, the processing devices are assigned a formula by which inter alia the speed of the respective processing device is specified.

By this formula the blow moulding machine in the prior art currently operates at a speed specified by the formula and is not speed-controllable. This means that it is currently not possible to adapt the speed of the blow moulding machine to the speed of connected machines such as for example a machine connected downstream and/or connected upstream, as is the case in the most extreme situation where they are combined in a block. The machines connected downstream of the blow moulding machine is usually a filler, a closer, a packaging station and/or a sterilisation device. Machines connected upstream of the blow moulding machine are usually an injection moulding machine, a preform sorter, a heating device and/or a sterilisation device. Accordingly, for example, in an inline system if an injection moulding machine is arranged upstream of the blow moulding machine and additionally if the possibility of buffering between the injection moulding machine and the blow moulding machine is present, the blow moulding machine would have to run faster in order to catch up. However, this is not possible in the prior art, since the speed of the blow moulding machine is specified by the assigned formula.

Instead, in the prior art in order to change the speed of the blow moulding machine, the blow moulding machine would first have to be run empty, which in particular would also require that for example an injection moulding machine connected upstream can only produce until a buffer arranged between the blow moulding machine and the injection moulding machine is full and the injection moulding machine is then likewise at a standstill. After the blow moulding machine has run empty, the blow moulding machine can then be assigned a new formula with a different speed. Then all machines can be re-started, which for example in the case of the heating device likewise requires considerable time since, in order to produce again, this device must first be heated up again to the necessary temperature. Accordingly, in the prior art it is in particular also not possible to compensate for temporary or suddenly occurring speed differences or to react in a process-specific manner to changing conditions.

The object of the present invention therefore is to provide a method and an apparatus which enable an adaptation of the speed of the blow moulding machine in particular to coupled machines, wherein this adaptation should take place in particular during the ongoing operation and without the need to switch off one or more machines. These objects are achieved according to the invention by the subjects of the independent claims. Advantageous embodiments and modifications are the subject of the subordinate claims.

A method according to the invention for processing plastic preforms and/or plastic containers has at least one first processing device, which processes the plastic containers in a first predetermined manner, and at least one second processing device, which processes the plastic containers in a second predetermined manner and which is connected upstream or downstream of the first processing device. Furthermore, the plastic containers are transported by means of a transport device from one processing device to the other processing device and the at least first processing device and the at least second processing device are coupled to one another. Furthermore, the first processing device is a blow moulding machine for transforming plastic preforms into plastic containers and the process speed of the blow moulding machine is specified by a formula which contains several process parameters which are characteristic for the transforming process.

According to the invention, by means of at least two key formulas the process parameters associated with at least one further process speed are determined at least partially, so that an adjustment of the process speed of the blow moulding machine to a speed of at least one further processing device is enabled and/or a setting of the speed is possible.

Accordingly, with the method according to the invention it is possible, if required and in particular also during operation, to operate the blow moulding machine individually at a different speed. Moreover, by the determination of the necessary process parameters for each further speed, not only can the blow moulding machine be operated at speeds which are predetermined by a previously stored formula, but also any required speed can be set. The method according to the invention advantageously proposes a speed-controllable blow moulding machine, the speed of which can be adapted to connected machines, such as for example a filler connected downstream or an injection moulding machine connected upstream. This is advantageous in terms of process engineering, in particular in the extreme situation in a block during the production process, since individual adaptation of the speed is made possible by the proposed method, wherein the productivity of the machine does not have to decrease for this purpose.

In this case plastic containers or containers are understood below to be both plastic preforms and also plastic containers which are already transformed.

A blow moulding machine is understood in particular to be an apparatus for transforming plastic preforms into plastic containers. This means that the plastic preforms are first of all thermally conditioned in a heating section and then are expanded by application of a liquid or gaseous medium. The flowable medium is preferably under pressure. For the delivery of the pressurised medium the apparatus has a blow moulding nozzle which can be placed onto a mouth of the plastic preforms to form a seal, in order thus to expand the plastic preforms with liquid or gaseous medium. In addition, a valve assembly is preferably also provided, which controls the delivery of the blowing air to the plastic preforms. However, it is preferably also conceivable that the expansion of the container takes place by means of the product, so that a simultaneous filling and expansion of the container is carried out.

The blow moulding machine is preferably a stretch blow moulding machine, which means that before and/or during the expansion the preforms are expanded in the longitudinal direction by means of a stretching rod. In this case the blow moulding stations each have stretching rods, which can be introduced into the plastic preforms and expand the plastic preforms in their longitudinal direction. In this case the stretching rods preferably have an electrical drive. However, it is preferably also conceivable to control the stretching rods by means of cams.

In an advantageous embodiment a plurality of blow moulding stations are arranged on a common movable support. In this case this support is in particular a rotatable support. The blow moulding stations each have a blow moulding device preferably forming a hollow space inside which the plastic preforms can be expanded into the plastic containers. In this case these blow moulding devices are preferably formed in multiple parts and each have two blow mould halves and a base mould. These blow mould halves can preferably be releasably arranged on a mould support shell or on the blow mould supports. The blow mould supports are pivotable with respect to one another in order to open and to close the blow moulding devices. Moreover, the blow mould support has locking mechanisms in order to lock the mould halves with respect to one another during the blow moulding process.

Particularly preferably, the blow moulding machine or the supports and the blow moulding arrangements are arranged inside a clean room which demarcates the blow moulding machine relative to an unsterile environment. In this case, driving devices for the closing, locking and/or opening of the blow moulds are preferably arranged outside the clean room.

The blow mould devices are preferably transported inside the clean room. The clean room is preferably delimited by several walls. In this case the clean room is delimited by at least one stationary wall and a wall which is movable relative to this stationary wall. The clean room demarcates the blow moulds in particular from an unsterile environment. The clean room is advantageously formed in an annular or toroidal manner around the blow moulding stations or reshaping stations and/or the transport path of the plastic containers.

In a preferred embodiment the process parameters are interpolated, and preferably linearly interpolated, according to a mathematical rule between a first key formula which contains a first speed and a second key formula which contains a second speed. In this case, however, other mathematical relationships between the key values would also be conceivable, such as for example an exponential interpolation, a logarithmic interpolation or the like. As already mentioned above, with the proposed method and also with the proposed apparatus it is possible for any value lying between the speeds of these key formulas to be set as the speed for the blow moulding machine. Therefore, according to the invention a possibility for speed control between previously defined "key formulas" is proposed, wherein for this purpose all process parameters are, for example, "linearly interpolated" between a formula for the speed x and a formula for the speed y.

In a further advantageous embodiment the process parameter which is characteristic for the transforming process is preferably a temperature of the plastic preform, so that an adaptation of the formula takes place with reference to a temperature of the plastic preform. This temperature is preferably an inlet temperature which the preform has on entry into the first processing device and preferably the blow moulding machine. In this case the temperature is advantageously determined on the mouth and/or the main body of the plastic preform. Accordingly, the adaptation of the formula takes place particularly preferably with reference to the inlet temperature of the plastic preforms.

Accordingly a modification or adaptation of a correspondingly interpolated formula may take place preferably according to predetermined rules with reference to the preform temperature, wherein the temperature is preferably determined at various points on the preform. The measurement of the preform temperature also takes place at different times. This is expedient in particular since as a result further information concerning the temperature state of the preform can be obtained.

In a further preferred embodiment the first speed is a minimum speed of the blow moulding machine and the second speed is a maximum speed of the blow moulding machine. Accordingly an interpolation between a minimum and a maximum speed of the blow moulding machine preferably takes place.

In an advantageous embodiment the process parameters determined between the key formulas and respective process speeds are stored in a further formula. For this, a storage device in which these new formulas are stored is preferably provided. This procedure makes it possible that speeds used once can be repeatedly retrieved and set, wherein they can also be accessed quickly through the storage. In this case a plant operator can preferably access the various formulas and select them by means of an operator terminal. The different formulas can preferably be assigned to the respective container type to be produced. This newly stored formula could preferably also be used as a further and/or additional key formula for the interpolation.

In a particularly preferred embodiment the process parameters which are characteristic of the transforming process are selected from a group of process parameters, which includes a temperature of the plastic preforms, a blow moulding pressure, a transforming time, switching times of the valves, a temperature of the blow mould, a stretching speed and the like.

An adaptation or change to the blow moulding machine speed also necessitates the adaptation or change to all parameters associated with the blow moulding process. If the blow moulding machine is operated for example at a higher speed it is also necessary for the oven which is connected upstream of the blow moulding machine to be operated for heating the plastic preforms at a higher speed. For this reason, however, it is necessary to increase the heat output of the oven or of the individual heater boxes arranged in the oven, since due to the higher speed of the oven the preforms would spend a shorter time in the oven and accordingly in the event of a consistent heat output they would have a temperature which is too low.

In a preferred embodiment, therefore, in the event of change to the process speed of the blow moulding machine, heating parameters of a heating device are changed. In this case, particularly preferably, a change to the heating parameters of the heating device takes place first, and then the speed of the blow moulding machine is changed. The heating device preferably has a plurality of heater boxes which are arranged along the transport path of the plastic preforms through the heating device.

The linear interpolation therefore preferably contains the smooth changeover and/or time-delayed activation of the changed heating parameters and, if necessary, the smooth and/or time-delayed changing over of the blowing parameters. It is particularly preferable to start the changeover or adaptation of the process parameters with those process parameters which have the greatest delay time until they become effective. The heating and/or cooling of the oven to the new necessary temperature requires, for example, significantly more time than the changeover of the speed at which, for example, the stretching rod is operated.

The changeover of the temperature of the oven preferably takes place by block or by heater box for the corresponding number preforms before the respective heater box. It is preferably also conceivable for the determination or calculation of the new process parameters to use more than two key formulas. In this case, particularly preferably, 2 to n key formulas can be used depending upon the requirements of the method.

In a particularly preferred embodiment the change of speed of the blow moulding machine takes place smoothly. In other words, the change of speed is not carried out jerkily or abruptly or rapidly, but little by little or step by step. Therefore, in particular, greater changes of speed are preferably implemented slowly and smoothly, without the control of the machine being unbalanced by sudden changes.

Accordingly the proposed procedure is advantageous in particular since in this way it is not necessary during the changeover to stop the blow moulding machine (intermittently) because of different preform temperatures. Instead, this provides a possibility for balancing with respect to different temperatures of the preform body and the preform mouth which might occur. Preferably, if necessary, the mouth of the preform could for example be actively cooled inside the blow moulding machine, wherein the blow moulding machine preferably has cooling devices for this purpose. Preferably, the temperatures could also be measured and in response thereto a changeover to a new formula or interpolation between key formulas could take place.

A buffering and in particular a buffering device is preferably provided between the blow moulding machine and the injection moulding machine. In this case this buffering device preferably serves for interim storage of the plastic preforms. By means of this buffering device and the adaptation of the machine speed in this case, for example, if the buffer is emptied, the output of the blow moulding machine is increased from 70,000 bottles to 72,000 bottles.

In the event of a decrease in the speed of the blow moulding machine but with the blow moulding speed remaining the same, a preform would not run through the entire circumferential angle, that is to say it would not run through a complete rotation of the blow moulding machine. Therefore it could preferably be ascertained that as a function of the speed of the blow moulding machine and a uniform blow moulding time the blow moulding process proceeds in a different angular range of the blow moulding machine and/or ends in a different angular range of the blow moulding machine, which preferably differs from a complete rotation of the blow mould. Particularly preferably in such an embodiment for example the stretching rod is controlled electrically instead of by means of guide cams.

Accordingly, in a preferred alternative procedure, unlike what was previously described, it would also be conceivable for the circumferential angle along which the stretch blow moulding process is carried out to be adapted as a function of the machine speed. The applicant therefore reserves the right, also independently of the method described above also to claim the adaptation of the circumferential angle which is mentioned here.

Furthermore, the present invention is also directed to an apparatus for processing plastic preforms and/or plastic containers with at least one first processing device, which processes the plastic containers in a first predetermined manner, and with at least one second processing device, which processes the plastic containers in a second predetermined manner and which is connected upstream or downstream of the first processing device, wherein the plastic containers can be transported by means of a transport device from one processing device to the other processing device and the at least first processing device and the at least second processing device can be coupled to one another, wherein the first processing device is a blow moulding machine for transforming plastic preforms into plastic containers and the process speed of the blow moulding machine can be specified by a formula which contains several process parameters which are characteristic for the transforming process.

According to the invention, by means of at least two key formulas the process parameters associated with at least one further process speed can be determined at least partially, so that an adjustment of the process speed of the blow moulding machine to a speed of at least one further processing device is enabled and/or a setting of the speed is possible.

Accordingly it is also proposed with regard to the apparatus to provide an apparatus according to the invention which makes possible an individual speed adaptation of the blow moulding machine during ongoing operation. In this case also with regard to the apparatus, by the determination of the necessary process parameters for each further speed, it should be achieved that the blow moulding machine is not only operated at speeds which are predetermined by previously stored formulas, but also that any required speed is set. The apparatus according to the invention advantageously proposes a speed-controllable blow moulding machine, the speed of which can be adapted to connected machines, such as for example a filler connected downstream or an injection moulding machine connected upstream.

In a preferred embodiment the second processing device is selected from a group of processing devices which includes an injection moulding machine for producing plastic preforms, a heating device for heating the plastic preforms, a filling device for filling the plastic containers, a closing device for closing the filled containers, a sterilisation device for sterilising the plastic preforms and/or plastic containers and the like.

In a further preferred embodiment the apparatus has a buffering device which is preferably arranged upstream of the blow moulding machine. Particularly preferably the buffering device is arranged between the blow moulding machine and an injection moulding machine. In this case the buffering device preferably serves for interim storage of plastic preforms.

Particularly preferably, also with regard to the apparatus a slow change of speed to the higher output takes place in order to slowly adapt the process. Advantageously, for example, when the buffer is empty it would be possible to change over again to a lower output and thus a slower speed.

In a further preferred embodiment the apparatus has a storage device in which the process parameters determined between the key formulas and respective process speeds can be stored in a further formula.

Further advantages and embodiments are apparent from the appended drawings.

Figure 2:
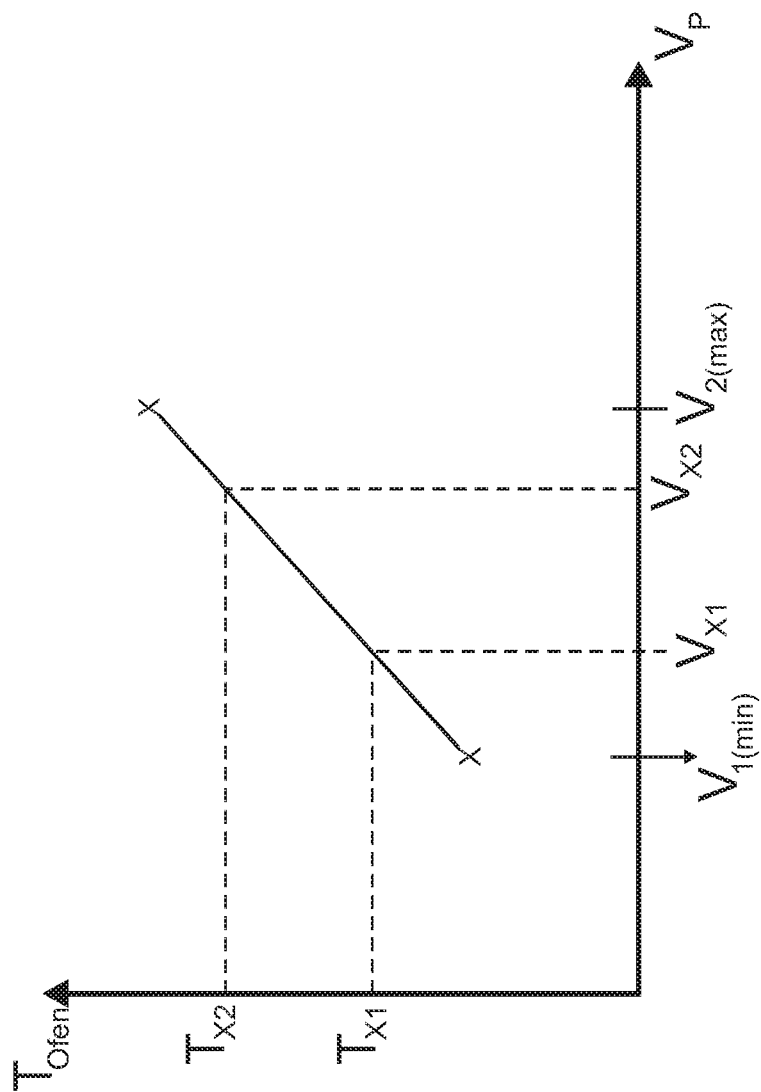

In the drawings:

FIG. 1 shows a schematic representation of an apparatus according to the invention; and FIG. 2 shows by way of example a graphic representation of a determination of process parameters according to the invention.

FIG. 1 shows a schematic representation of an apparatus 1 according to the invention having at least one first processing device 2 and one second processing device 4, wherein in this representation in particular the basic structure of the different processing devices 2, 4 is evident, wherein the processing devices are in particular coupled to one another in a block or are synchronised with one another. In this case the reference 25 designates the blow moulding machine, wherein a heating device 30, a buffering device 35 and an injection moulding machine 40 are arranged downstream of the blow moulding machine 25 and a filling device 50 is arranged upstream of the blow moulding machine.

Accordingly, in the embodiment illustrated here the first processing device 2 is a blow moulding machine 25 and the second processing device is for example a filling device 50 and/or an injection moulding machine 40 and/or a heating device 30. In this case, however, the structure of the apparatus is not limited to the sequence or arrangement of the individual devices illustrated in FIG. 1. In particular it is also conceivable that the sequence of the device is changed or the devices are arranged in a different sequence or also fewer or more devices are present than shown here.

Transport devices 5, which transport the plastic preforms 10 and/or plastic containers 20 to the respectively following device, are preferably arranged between the individual devices 40, 35, 30, 25, 50. The transport devices can be, for example, conveyor belts, transport chains, transport starwheels or the like. Is in this case preferably any type of transport device is possible which is suitable and intended for transporting plastic preforms and/or plastic containers. In the representation of FIG. 1 the plastic preforms 10 are preferably produced inside the injection moulding machine 40 by extrusion blow moulding and then fed to the heating device 30 and/or the buffering device 35, wherein the preforms 10 are heated inside the heating device 30 by means of a plurality of heater boxes HK1 . . . HK10 to the necessary temperature for the transforming and are then fed to the blow moulding machine 25.

In this case the blow moulding machine 25 has a plurality of blow moulding stations 6 which are arranged on a rotatable support 7 and inside which the preforms 10 are transformed into containers 20. After this transforming the containers 20 are passed on to a filling device 50 which fills the containers with the required product. In this case a closing device (not shown) and/or a packaging plant can be connected downstream of the filling device 50.

FIG. 2 shows by way of example a graphic representation of a determination of process parameters according to the invention. In this case the X-axis of the graph denotes a process speed $V_P$ of the blow moulding machine and the Y-axis denotes a process parameter which here is for example the temperature $T_{OFEN}$ of the oven or of the heating device. In this case the reference $V_1$ relates to a first speed which is stored in a first key formula and the reference $V_2$ relates to a second speed which is stored in a second key formula, wherein the first speed $V_1$ is for example preferably a minimum speed of the blow moulding machine and the second speed $V_2$ is for example a maximum speed of the blow moulding machine. However, other speed values would also be conceivable.

If the speed of the blow moulding machine were now to be changed, the two speeds $V_1$ and $V_2$ of the key formulas as well as their associated process parameters of the oven temperature are used as reference values, in order by interpolation between these two speeds to determine the process parameters for each further speed which lie between the speeds $V_1$ and $V_2$. For instance in this example the process parameters $T_{x1}$ and $T_{x2}$ are determined for the speeds $V_{x1}$ and $V_{x2}$. By means of these determined values the blow moulding machine can now be set to a different speed. With these values a new formula can preferably also be stored within a storage device 100, which is illustrated schematically in FIG. 1. In this case it will be understood that, when the blow moulding speed is set or adjusted, not only must the temperature of the oven be adjusted to the new speed, but also the further process parameters, and in particular all process parameters which are characteristic for the blow moulding operation, must be adjusted.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 first processing device
4 second processing device
5 transport device
6 blow moulding station
7 support
10 plastic preforms
20 plastic containers
25 blow moulding machine
30 heating device
35 buffering device
40 injection moulding machine
50 filling device
100 storage device
HK1 . . . HK10 heater boxes
$T_{OFEN}$ oven temperature
$V_P$ process speed
$V_1$ first speed
$V_2$ second speed
$V_X$ further process speed

The invention claimed is:

1. Method for processing plastic preforms (10) and/or plastic containers (20) with at least one first processing device (2), which processes the plastic containers (10, 20) in a first predetermined manner, and with at least one second processing device (4), which processes the plastic containers (10, 20) in a second predetermined manner and which is connected upstream or downstream of the first processing device (2), wherein the plastic containers (10, 20) are transported by means of a transport device (5) from one processing device (2, 4) to the other processing device (2, 4) and the at least first processing device (2) and the at least second processing device (4) are coupled to one another, wherein the first processing device (2) is a blow moulding machine (25) for transforming plastic preforms (10) into plastic containers (20) and a process speed of the blow moulding machine (25) is specified by a formula which contains several process parameters which are characteristic for the transforming process, characterised in that, by means of at least two key formulas the process parameters associated with at least one further process speed are determined so that an adjustment of the process speed of the blow moulding machine (25) to a speed of at least one further processing device (2, 4) is enabled and/or a setting of the speed is possible.

2. Method according to claim 1, characterised in that the process parameters are interpolated according to a mathematical rule between a first key formula which contains a first speed and a second key formula which contains a second speed.

3. Method according to claim 2, characterised in that the first speed is a minimum speed of the blow moulding machine (25) and the second speed is a maximum speed of the blow moulding machine (25).

4. Method according to claim 1, characterised in that the process parameter which is characteristic for the transforming process is preferably a temperature of the plastic preform, so that an adaptation of the formula takes place with reference to a temperature of the plastic preform.

5. Method according to claim 1, characterised in that the process parameters determined between the key formulas and respective process speeds are stored in a further formula.

6. Method according to claim 1, characterised in that the change of speed of the blow moulding machine (25) takes place smoothly, so that the change of speed is not carried out jerkily or abruptly or rapidly, but little by little or step by step.

7. Method according to claim 1, characterised in that the process parameters which are characteristic of the transforming process are selected from a group of process parameters, which includes a temperature of the plastic preforms, a blow moulding pressure, a transforming time, switching times of the valves, a temperature of the blow mould, and/or a stretching speed.

8. Method according to claim 1, characterised in that, in the event of a change to the process speed of the blow moulding machine (25), heating parameters of a heating device (30) are also changed.

9. Method according to claim 8, characterised in that a change to the heating parameters of the heating device (30) takes place first, and then the speed of the blow moulding machine (25) is changed.

10. Apparatus (1) for processing plastic preforms (10) and/or plastic containers (20) with at least one first processing device (2), which processes the plastic containers (10, 20) in a first predetermined manner, and with at least one second processing device (4), which processes the plastic containers (10, 20) in a second predetermined manner and which is connected upstream or downstream of the first processing device, wherein the plastic containers (10, 20) can be transported by means of a transport device (5) from one processing device (2, 4) to the other processing device (2, 4) and the at least first processing device (2) and the at least second processing device (4) can be coupled to one another, wherein the first processing device (2) is a blow moulding machine (25) for transforming plastic preforms (10) into plastic containers (20) and the process speed of the blow moulding machine (25) can be specified by a formula which contains several process parameters which are characteristic for the transforming process, characterised in that, by means of at least two key formulas the process parameters associated with at least one further process speed can be determined so that an adjustment of the process speed of the blow moulding machine (25) to a speed of at least one further processing device (2, 4) is enabled and/or a setting of the speed is possible.

11. Apparatus (1) according to claim 10, characterised in that the second processing device (4) is selected from a group of processing devices which includes an injection moulding machine (40) for producing plastic preforms (10), a heating device (30) for heating the plastic preforms (10), a filling device (50) for filling the plastic containers (20), a closing device for closing the filled containers (20), and a sterilisation device for sterilising the plastic preforms (10) and/or plastic containers (20).

12. Apparatus (1) according to claim 10, characterised in that the apparatus has a buffering device (35) which is arranged upstream of the blow moulding machine (25).

13. Apparatus (1) according to claim 10, characterised in that the apparatus (1) has a storage device (100) in which the process parameters determined between the key formulas and respective process speeds can be stored in a further formula.

* * * * *